United States Patent
Shekhar et al.

(10) Patent No.: US 9,590,854 B1
(45) Date of Patent: Mar. 7, 2017

(54) AUTOMATED NETWORK SECURITY

(71) Applicant: Amazon Technologies, Inc., Reno, NV (US)

(72) Inventors: Shashank Shekhar, Seattle, WA (US); Gurinder Raju, Seattle, WA (US); Andrew Stuart Huntwork, Seattle, WA (US); David Edouard Louis Robert, Seattle, WA (US); Pravi Garg, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 329 days.

(21) Appl. No.: 14/314,548

(22) Filed: Jun. 25, 2014

(51) Int. Cl.
*H04L 12/24* (2006.01)

(52) U.S. Cl.
CPC ................................ *H04L 41/0873* (2013.01)

(58) Field of Classification Search
CPC ............. H04L 41/0873; H04L 41/0866; H04L 41/0869
See application file for complete search history.

(56) References Cited

U.S. PATENT DOCUMENTS

| | | | | |
|---|---|---|---|---|
| 6,233,606 B1* | 5/2001 | Dujari | ............... | G06F 17/30902 707/E17.12 |
| 8,064,438 B1* | 11/2011 | Croak | ....................... | H04L 1/24 370/241 |
| 2004/0267922 A1* | 12/2004 | Rover | ................. | H04L 41/0806 709/223 |
| 2005/0038818 A1* | 2/2005 | Hooks | ................. | G06F 11/0748 |
| 2005/0055575 A1* | 3/2005 | Evans | ................. | H04L 41/0809 726/4 |
| 2011/0066876 A1* | 3/2011 | Shannon | ............. | G06F 11/0793 714/4.11 |
| 2014/0369209 A1* | 12/2014 | Khurshid | ............ | H04L 41/0866 370/250 |

* cited by examiner

*Primary Examiner* — Michael C Lai
(74) *Attorney, Agent, or Firm* — Kilpatrick Townsend & Stockton LLP

(57) ABSTRACT

Techniques for providing a network auditing service may be provided. Information about a configuration of a potentially compromised network of computer resources may be compared to a maintained and standard network configuration that is distinct from the potentially compromised network to determine differences. In one example, the potentially compromised network of computer resources may be periodically scanned for configuration information, which may be compared to the standard network configuration to determine if any changes have occurred that would indicate security problems. A report of the differences between the potentially compromised network and the standard network configuration information may be generated and provided for presentation.

19 Claims, 8 Drawing Sheets

AUTOMATED NETWORK SECURITY

BACKGROUND

An ever-increasing number of applications and services are being made available over networks such as the Internet. Additionally, content, applications, and/or service providers are turning to shared-resource technologies such as cloud computing and distributed data centers to meet the increased demand for Internet services. Cloud computing, in general, provides access to electronic resources where the hardware and/or software used to support Internet services is dynamically scalable to meet the needs of customers at any given time. A customer interacting with a service provider may require access to a network of computer resources that can provide them with their own customer specific requirements, rules, and policies. A customer may need to provide instructions or computer code to the service provider to configure their network of computer resources in a particular configuration or according to their own rules. Service providers of scalable networks are torn between providing customers an environment to flexibly configure their network/develop software and maintaining the security of their own network.

BRIEF DESCRIPTION OF THE DRAWINGS

Various embodiments in accordance with the present disclosure will be described with reference to the drawings, in which.

DETAILED DESCRIPTION

Figure 1:
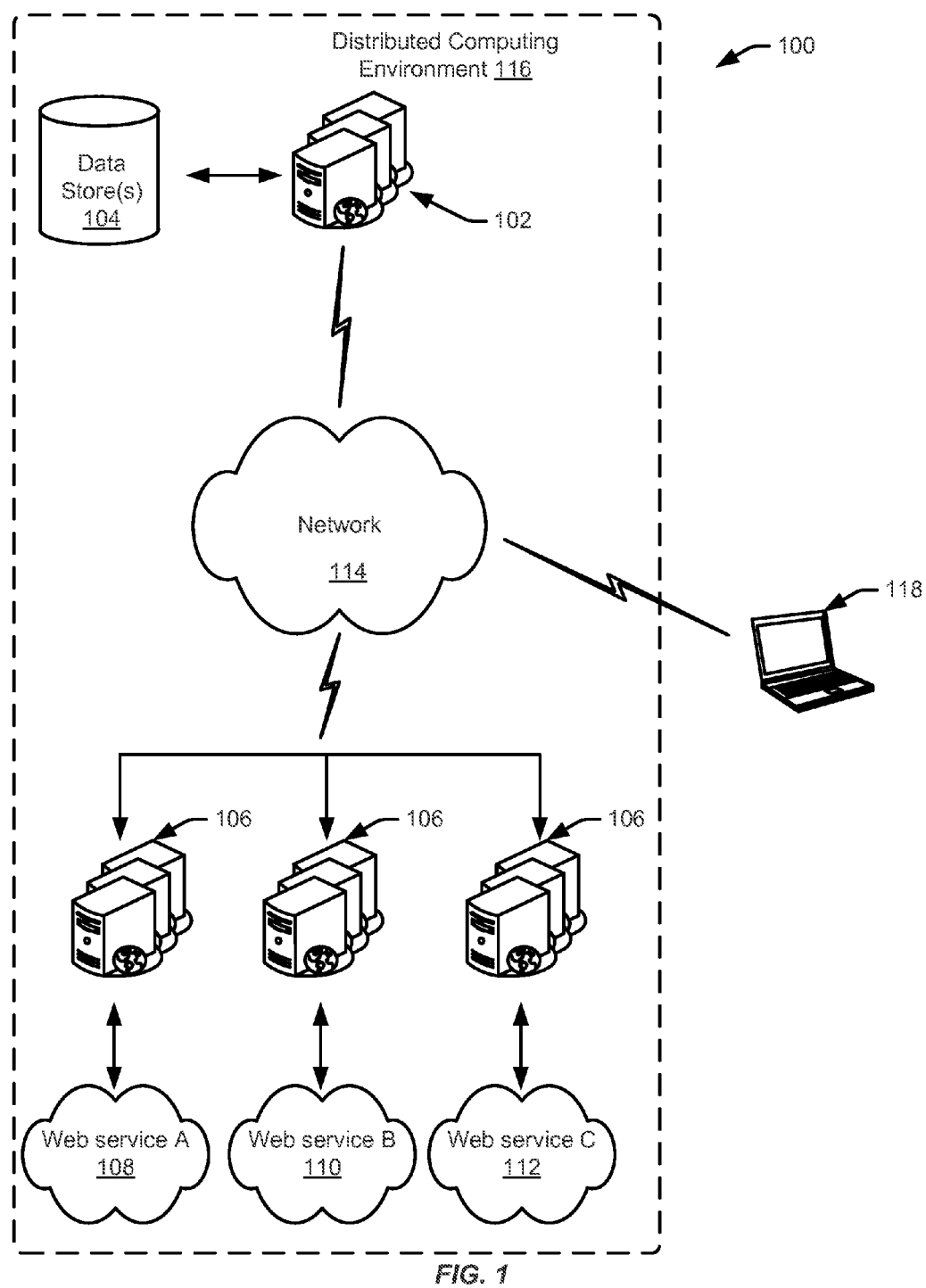
FIG. 1 is a flow diagram that illustrates an example of a network auditing feature in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and computer-readable medium for providing a network auditing feature for computer applications and computer resources. In accordance with at least one embodiment, a service may be provided for automatically auditing a network for security threats by determining differences between actual (e.g., current) network configurations and a standard network configuration maintained by a network auditing service. The differences between the network configurations may be collated into a report that may then be provided for presentation to either a network administrator or a user. The differences between the network configurations may represent a security threat or indicate that a network of computer resources has been compromised. The network auditing service can periodically obtain network configuration information or metadata from a network of computer resources to determine differences when compared to the standard network configuration.

In some embodiments, a network of computer resources, from which the network configurations are derived, are configured to implement computer program code provided by users or customers associated with the service. However, the provided instructions or computer program code may be malicious and could potentially compromise other customers' networks or the networks of the service. Thus, user network configurations derived from a network of computer resources associated with the user but provided by the service may inherently be untrusted networks of computer resources or may include untrusted program code, as they are distinct from the standard network configuration. The configuration of the network of computer resources may be provided for a user/customer by the service but may be distinct from the standard network configuration, the computer resources utilized from which the standard network configuration is derived, or from other networks of computer resources provided to other users/customers.

In accordance with at least one embodiment, the metadata can include configuration information about a network of computer resources. For example, configuration information can include the current state of computer resources within a network, port ranges allowed for a network, user internet protocol (IP) addresses, routing tables, or any suitable information that indicates the operating characteristics of the network of computer resources and the physical and logical connections that have been defined between them. A web service customer or user of a network of computer resources may be provided with information detailing the differences determined between their network and the standard network configuration. In some examples, when no differences are determined between the standard network configuration and the reviewed or scanned network configurations, then no report of differences between the network configurations may generated or provided.

In some examples, the network auditing service may communicate with a potentially compromised network by interacting with a control plane associated with the potentially compromised network to obtain the networks configuration information or metadata. The control plane associated with the potentially compromised network is external to the network or incapable of receiving and implementing malicious code provided by the user. Instead, the control plane communicates with the potentially compromised network via API calls invoked by the control plane and not invoked within the potentially compromised network. For example, the service may make an application programming interface (API) call to the control plane to obtain metadata or configuration information of the network associated with the control plane. By interacting with the control plane associated with the potentially compromised network of computer resources the service is able to accurately detail the network configuration without interference from malicious code. If the service were to communicate directly with the potentially compromised network, the malicious code may be able to provide information that makes it appear as though the network has not been changed or violated according to a set of rules or standards but that actually is changed in violation of a standard network configuration or set of rules. In accordance with at least one embodiment, a control plane can be used to manage and/or alter various aspects of a data environment or distributed computing environment. For example, a plurality of externally-visible APIs may be provided to a customer of a distributed computer environment to enable the customer to perform specific functions with respect to a computer resource. The network auditing service may make an API call to the control plane that requests every externally-visible API call by a customer to create a data structure that resembles the network configuration. The network auditing service may obtain a network's configuration information by interacting with an associated programmatic interface and invoking interface elements of the programmatic interface. The metadata or configuration information may be used to create an informational data structure that can be compared to the standard network configuration to determine differences between the two. A programmatic interface can include any suitable messaging protocol, API, a web service interface, or any interface configured in a representational state transfer (REST) architecture.

In a non-limiting example, the service may maintain information about a standard network configuration. The service may then periodically obtain configuration information from a network of computer resources. For example, the service may call an API of a control plane to receive the network configuration information. The service may compare the network configurations to determine any differences that may represent a security threat or compromised network. The service may generate a report of the differences between the network configurations and provide the differences to a network administrator. Changes can be made to the network in question utilizing the differences to place the network configuration in compliance with the standard network configuration. For example, the network administrator can call APIs of the control plane to place the network configuration in compliance and/or, in some cases, code may be utilized to automatically revert the changes made to the network.

In some examples, the service may iteratively obtain network configuration information from a network at varying intervals. The iterative scans of the network can be compared to each other to determine differences between the network configurations at different time points. In accordance with at least one embodiment, the differences between the same network configuration at different time points may be generated into a report and provided to a network administrator. In accordance with at least one embodiment, the service may determine a difference exists between network configurations based on an exact match criteria. For example, when comparing a standard network configuration to a network in question, any difference between the two may be considered a difference and included in a report. In accordance with at least one embodiment, the service may utilize a set of rules or policies which allows for fuzzy matching or less stringent requirements before a difference between network configurations is considered to be relevant and included in a report for presentation.

In accordance with at least one embodiment, the service may maintain multiple standard network configurations for comparison to an actual network configuration. In accordance with at least one embodiment, the service may maintain a plurality of policies associated with the standard network configuration. Each policy may be relevant to only a portion of the standard network configuration. For example, a particular policy may only be relevant when attempting to determine differences in allowed port ranges in a network configuration. In some examples, each policy of the plurality of polices may identify different criteria or be distinct, such as a policy for determining which computers may be allowed on the network or a policy for determining the number of connections between computers on the network. The distinct policies may also be organized according to a hierarchical standard indicating importance of the policy. The service may determine a difference between network configurations based at least in part on the configuration information and the distinct policies of the plurality of policies described above. The service may determine trend information based on collected reports of differences between network configurations. The service may also utilize the trend information to contact particular customers or users of computer resources to determine the origin of a network security threat.

FIG. 1 is a flow diagram 100 that illustrates an example of a network auditing feature in accordance with at least one embodiment. In accordance with at least one embodiment, a network auditing service 102 may maintain a standard network configuration in one or more data stores 104. In accordance with at least one embodiment, the network auditing service 102 may obtain the standard network configuration by performing an initial scan or initially obtaining the network configuration of a network in question and designating it as the standard configuration. In accordance with at least one embodiment, the network auditing service 102 may communicate with one or more computer resources 106 that are utilized to implement one or more web services 108-112 via public networks 114. In accordance with at least one embodiment, the one or more computer resources 106 and web services 108-112 may be implemented in a distributed computing environment 116. In accordance with at least one embodiment, the one or more computer resources 106 and web services 108-112 may be individual sub-networks within a larger computer resource network that is audited by the network auditing service 102.

In accordance with at least one embodiment, the network auditing service may obtain the network configuration of the one or more computer resources 106 by interacting with a control plane (not shown) associated with the computer resources 106. In accordance with at least one embodiment, the network auditing service 102 may interact with the control plane to obtain metadata that includes the network configuration. In accordance with at least one embodiment, the metadata indicates particular API calls made by each web service which when collated identify the current network configuration of computer resources implementing a web service. In accordance with at least one embodiment, the network auditing service 102 compares the network configuration information of the one or more computer resources 106 to the standard network configuration maintained in the one or more data stores 104. The network auditing service 102 may generate a report of the differences between the network configurations. In accordance with at least one embodiment, the network auditing service 102 may provide the generated report of differences to a network administrator 118. In accordance with at least one embodiment, the network administrator 118 may utilize the report of differences to modify the current network configuration to be in compliance with the standard network configuration, reverting any changes identified by the network auditing service. In accordance with at least one embodiment, the network auditing service 102 may provide a program script that will automatically modify the network configuration of the one or more computer resources 106 to be identical to the standard network configuration. In accordance with at least one embodiment, the network administrator 118 may also provide computer code to automatically update the network configuration in question based on the differences determined by the network auditing service 102.

Figure 2:
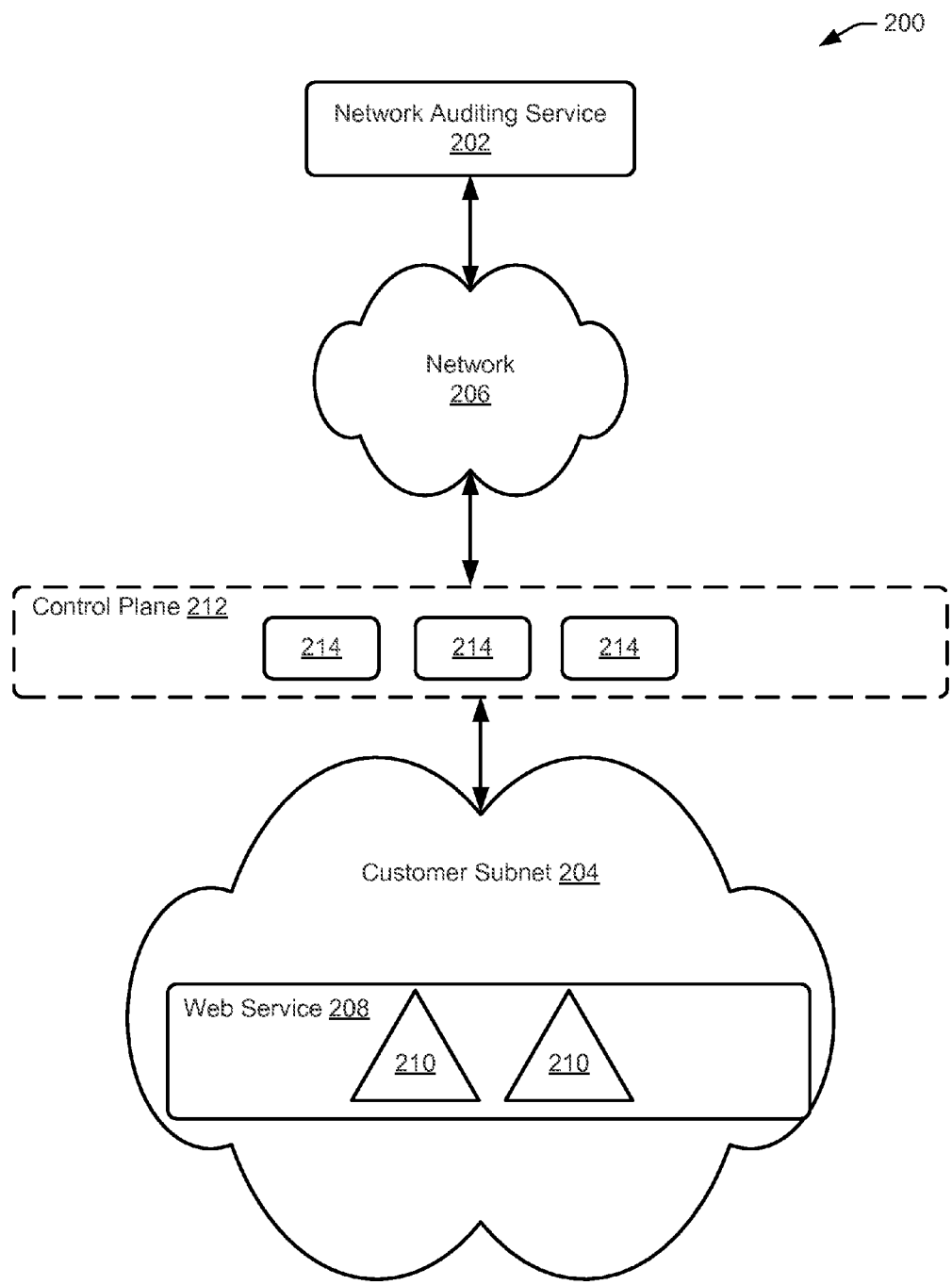
FIG. 2 is a flow diagram that illustrates an example of a network auditing feature in accordance with at least one embodiment.

FIG. 2 is a flow diagram that illustrates an example of a network auditing feature in accordance with at least one embodiment. While this example is discussed with respect to the internet, web services, and internet-based technology, it should be understood that aspects of the various embodiments can be used with any appropriate services available or offered over a network in an electronic environment. Further, while the components in FIG. 2 are separated into control planes and sub networks it should be understood that this can refer to an actual or virtual separation of at least some resources (e.g., hardware and/or software) used to provide the respective functionality. In accordance with at least one embodiment, the network auditing service 202 may obtain the network configuration from a customer subnet 204 implemented within a network 206 associated with the network auditing service 202. The customer subnet 204 may be distinct from the network 206 that is associated with the network auditing service 202. In accordance with at least one embodiment, the network 206 may maintain or operate a plurality of customer subnets, each customer subnet 204 requiring its own firewalls, routing tables, and policies. In accordance with at least one embodiment, a customer subnet 204 may implement a web service 208. The web service 208 may include one or more customer facing APIs 210 for configuring their customer subnet to support their web service 208. The various one or more customer facing APIs 210 may be used to perform specific functions with respect to a computer resource, such as a relational database, in the data environment of a web service or other network of computer resources. As briefly described above, a user or customer associated with the web service 208 may knowingly or unknowingly implement changes to their subnet 204 via the APIs 210 which create security problems for not only their own subnet 204 but other users subnets as well. In particular, code may be implemented that can mislead any internal sub-network security scans to believe that the current configuration is a correct configuration.

In accordance with at least one embodiment, the network auditing service 202 may obtain the customer subnet 204 network configuration by interacting with a control plane 212 associated with the subnet 204. The control plane in this embodiment is essentially a virtual layer of hardware and software components that handles control and management of actions, such as provisioning, scaling, replication, or any operations needed to implement networks of computer resources. In accordance with at least one embodiment, the network auditing service 202 may invoke several APIs 214 of the control plane to obtain metadata from the customer subnet 204 that indicates the network configuration. In accordance with at least one embodiment, the network auditing service 202 may periodically obtain the network configuration to determine differences between the current network configuration and the standard network configuration. In accordance with at least one embodiment, the network auditing service 202 may audit network configurations at various time periods, including every minute, hour, or day. In accordance with at least one embodiment, the network auditing service 202 may obtain the network configuration information by invoking interface elements of a programmatic interface associated with a network of computer resources. In accordance with at least one embodiment, the network auditing service 202 may transform the network configuration information into a data structure for comparison to the standard network configuration to determine differences. In accordance with at least one embodiment, an API 214 of the control plane 212 that obtains the metadata may transform the information obtained by the APIs into a data structure for provision to the network auditing service 202. In accordance with at least one embodiment, upon the network auditing service 202 determining that differences exist between the current network configuration and the standard network configuration, the network auditing service 202 may utilize the control plane 212 APIs 214 to modify the customer subnet 204. The modifications made to the customer subnet 204 of computer resources may prevent any security threats that were implemented by customer provided code through the one or more APIs 210.

Figure 3:
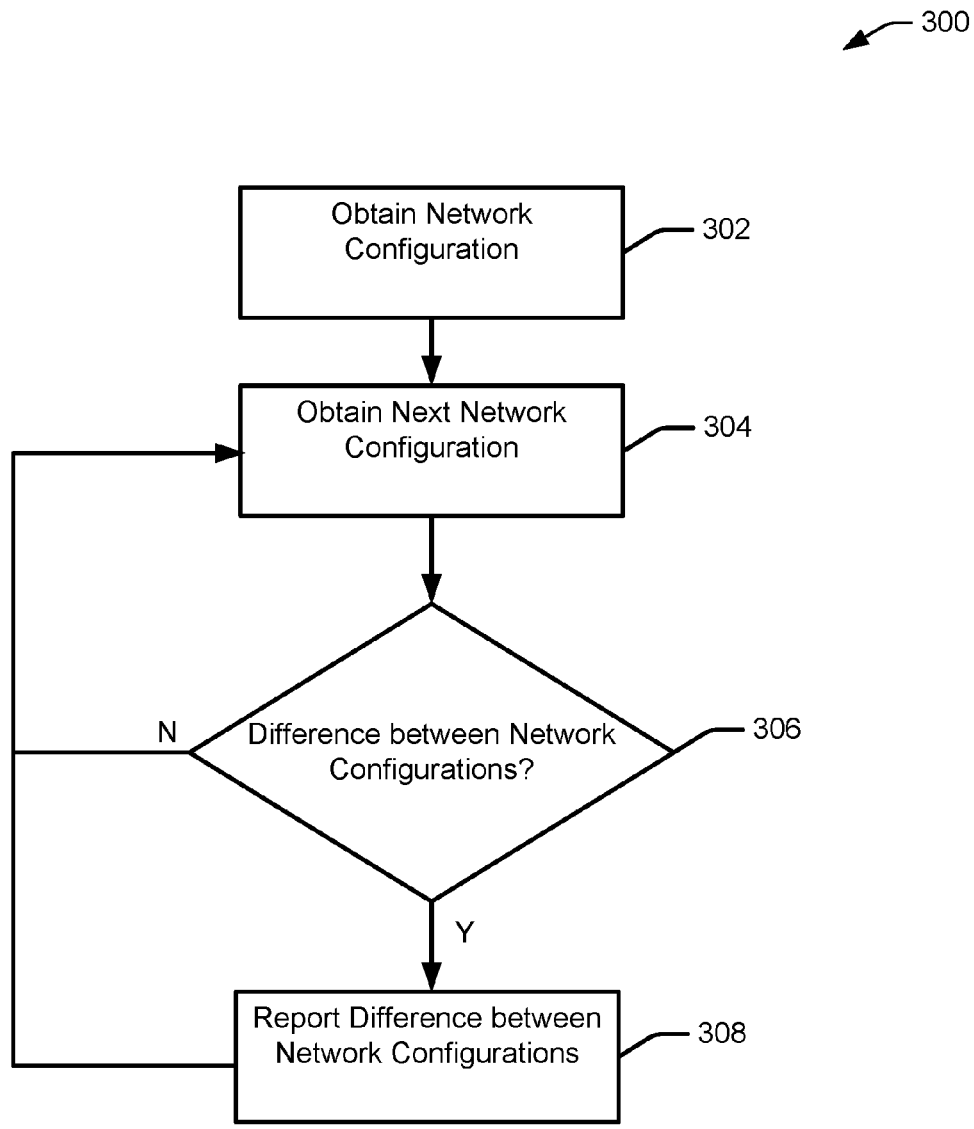
FIG. 3 is a flow diagram that illustrates an example of a network auditing feature in accordance with at least one embodiment.

FIG. 3 illustrates a flow diagram of a network auditing feature in accordance with at least one embodiment. In FIG. 3 the process 300 may begin by obtaining network configuration information from a network. In accordance with at least one embodiment, the network auditing service may obtain the network configuration information from a network of computer resources at an initial time point by interacting with a control plane associated with the network. In accordance with at least embodiment, the network configuration information may iteratively be obtained at various time points. At 304, the process 300 may include obtaining the next network configuration information from the network of computer resources in question. As described above, the next network configuration information may be obtained at a different time point then the initial time point.

In accordance with at least one embodiment, the process 300 may continue at 306 by determining a difference between the network configurations when compared to each other. In accordance with at least one embodiment, the network auditing service may determine that a difference exists between the network configuration if the configurations are not an identical match of each other. In accordance with at least one embodiment, several rules or policies may apply to the network being audited which allow for fuzzy match to occur without detecting a difference between network configurations. For example, a rule may indicate that port numbers may range between two values without being considered different from each other. If the network auditing service does not detect a difference then the next network configuration is obtained for comparison to the network configuration previously obtained.

The iterative comparison of network configurations continues until a difference is determined by the network auditing service. In accordance with at least one embodiment, if a difference is determined between network configurations at 308 a report of differences between network configurations is generated and provided for presentation. In accordance with at least one embodiment, the network auditing service does not take a corrective action once a difference has been determined between network configurations. Instead, the service continues to iteratively compare network configurations and generating reports of differences that are occurring over time. These cumulative reports of changes that are occurring over time can be utilized by the network auditing service to determine trends of potential security threats or to identify particular resources that are the source of the security threat. In accordance with at least one embodiment, the network auditing service can take corrective action to modify the network configuration based on the differences determined between network configurations. Automatic modification of the network configuration based on the determined differences would allow a network configuration to remain identical to its initial network configuration in an embodiment. In accordance with at least one embodiment, the reported differences between the network configuration may still be analyzed by the network auditing service to determine trend information.

Figure 4:
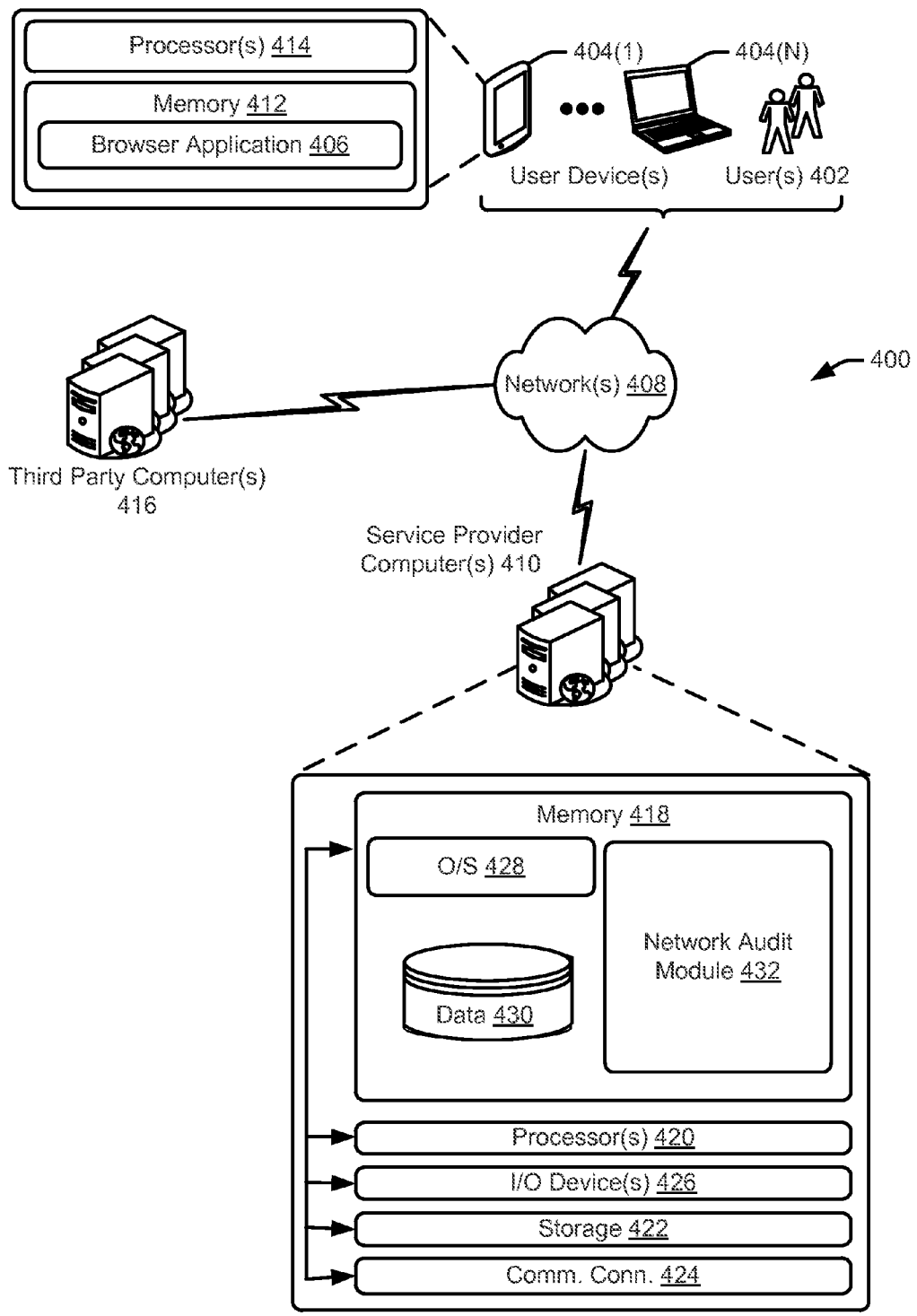
FIG. 4 illustrates an example architecture for a network auditing feature as described herein that includes one or more service provider computers and/or a user device connected via one or more networks, in accordance with at least one embodiment.

FIG. 4 illustrates an example architecture for a network auditing feature as described herein that includes one or more service provider computers and/or a user device (that network administrators may interact with) connected via one or more networks, in accordance with at least one embodiment. In architecture 400, one or more users 402 may utilize user computing devices 404(1)-(N) (collectively, user devices 404) to access a browser application 406 (e.g., a web browser) or a user interface (UI) accessible through the browser application 406, via one or more networks 408. The "browser application" 406 can be any browser control or native application that can access and display a web page or other information. In some aspects, the browser application 406 may display an interactive UI for invoking the network auditing feature and view the generated report differences between network configurations as described above. In some aspects, the browser application 406 may be hosted, managed, and/or provided by a computing resources service or service provider, such as by utilizing one or more service provider computers 410. The one or more service provider computers 410 may, in some examples, provide computing resources such as, but not limited to, client entities, low latency data storage, durable data storage, data access, management, virtualization, cloud-based software solutions, electronic content performance management, etc. The one or more service provider computers 410 may also be operable to provide web hosting, computer application development, and/or implementation platforms, combinations of the foregoing, or the like to the one or more users 402.

In one illustrative configuration, the user computing devices 404 may include at least one memory 412 and one or more processing units or processor(s) 414. The processor(s) 414 may be implemented as appropriate in hardware, computer-executable instructions, firmware, or combinations thereof. Computer-executable instruction or firmware implementations of the processor(s) 414 may include computer-executable or machine-executable instructions written in any suitable programming language to perform the various functions described. The user devices 404 may also include geo-location devices (e.g., a global positioning system (GPS) device or the like) for providing and/or recording geographic location information associated with the user devices 404.

The memory 412 may store program instructions that are loadable and executable on the processor(s) 414, as well as data generated during the execution of these programs. Depending on the configuration and type of user device 404, the memory 412 may be volatile (such as random access memory (RAM)) and/or non-volatile (such as read-only memory (ROM), flash memory, etc.). The user device 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 412 may include multiple different types of memory, such as static random access memory (SRAM), dynamic random access memory (DRAM), or ROM.

Turning to the components of the memory 412 in more detail, the memory 412 may include an operating system and one or more application programs or services for implementing the features disclosed herein including providing a network audit feature to the user via the browser application 406 or dedicated applications (e.g., smart phone applications, tablet applications, etc.). The browser application 406 may be configured to receive and provide instructions to invoke the network auditing service via the one or more service provider computers 410 and display a generated report of differences between network configurations as described above. Additionally, the memory 412 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 402 provided response to a security question or a geographic location obtained by the user device 404.

In some examples, the networks 408 may include any one or a combination of many different types of networks, such as cable networks, the Internet, wireless networks, cellular networks and other private and/or public networks. While the illustrated example represents the users 402 accessing the browser application 406 over the networks 408, the described techniques may equally apply in instances where the users 402 interact with the one or more service provider computers 410 via the one or more user devices 404 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 406 may allow the users 402 to interact with the one or more service provider computers 410 for executing the network auditing feature as describe herein. The one or more service provider computers 410, perhaps arranged in a cluster of servers or as a server farm, may host the browser application 406 and/or cloud-based software services. Other server architectures may also be used to host the browser application 406 and/or cloud-based software services. The browser application 406 may be capable of handling requests from many users 402 and serving, in response, various user interfaces that can be rendered at the user devices 404 such as, but not limited to, a website or web page. The browser application 406 can interact with any type of website that supports user interaction, including social networking sites, electronic retailers, informational sites, blog sites, search engine sites, news and entertainment sites, and so forth. The described techniques can similarly be implemented outside of the browser application 406, such as with other applications running on the user device 404, such as through a command line tool.

The one or more service provider computers 410 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 410 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 410 may be in communication with the user device 404 via the networks 408, or via other network connections. The one or more service provider computers 410 may include one or more servers, perhaps arranged in a cluster or as individual servers not associated with one another. The one or more service provider computers 410 may be in communication with one or more third party computers 416 via networks 408. The one or more service provider computers 410 that host the browser application 406 may obtain and provide data to third party computers 416 via networks 408 in accordance with embodiments described herein. The one or more third party computers 416 may implement networks of computer resources that can be audited for security threats by the network auditing service implemented by the service provider computers 410.

In one illustrative configuration, the one or more service provider computers 410 may include at least one memory 418 and one or more processing units or processors(s) 420. The processor(s) 420 may be implemented as appropriate in hardware, computer-executable instructions, firmware, or combinations thereof. Computer-executable instruction or firmware implementations of the processor(s) 420 may include computer-executable or machine-executable instructions written in any suitable programming language to perform the various functions described. The memory 418 may store program instructions that are loadable and executable on the processor(s) 420, as well as data generated during the execution of these programs. Depending on the configuration and type of the one or more service provider computers 410, the memory 418 may be volatile (such as RAM) and/or non-volatile (such as ROM, flash memory, etc.). The one or more service provider computers 410 or servers may also include additional storage 422, which may include removable storage and/or non-removable storage. The additional storage 422 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 418 may include multiple different types of memory, such as SRAM, DRAM, or ROM.

The memory 418, the additional storage 422, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 418 and the additional storage 422 are all examples of computer storage media. Additional types of computer storage media that may be present in the one or more service provider computers 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 410. Combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 410 may also contain communication connection(s) 424 that allow the one or more service provider computers 410 to communicate with a stored database, another computing device or server, user terminals and/or other devices on the networks 408. The one or more service provider computers 410 may also include I/O device(s) 426, such as a keyboard, a mouse, a pen, a voice input device, a touch input device, a display, speakers, a printer, etc.

Turning to the contents of the memory 418 in more detail and as will be described in further detail in FIG. 5, the memory 418 may include an operating system 428, one or more data stores 430, and/or one or more application programs or services for implementing the features disclosed herein including a network audit module 432. In accordance with at least one embodiment, the network audit module 432 may be configured to maintain a standard network configuration, obtain metadata indicating a network configuration by interacting with a programmatic interface of a control plane associated with a network of computer resources, determine a difference between the standard network configuration and the network of computer resources, generate a report of the differences between the network configurations, and in response to receiving input, updating the network of computer resources by interacting with the control plane based at least in part on the generated report of differences between network configurations.

Figure 5:
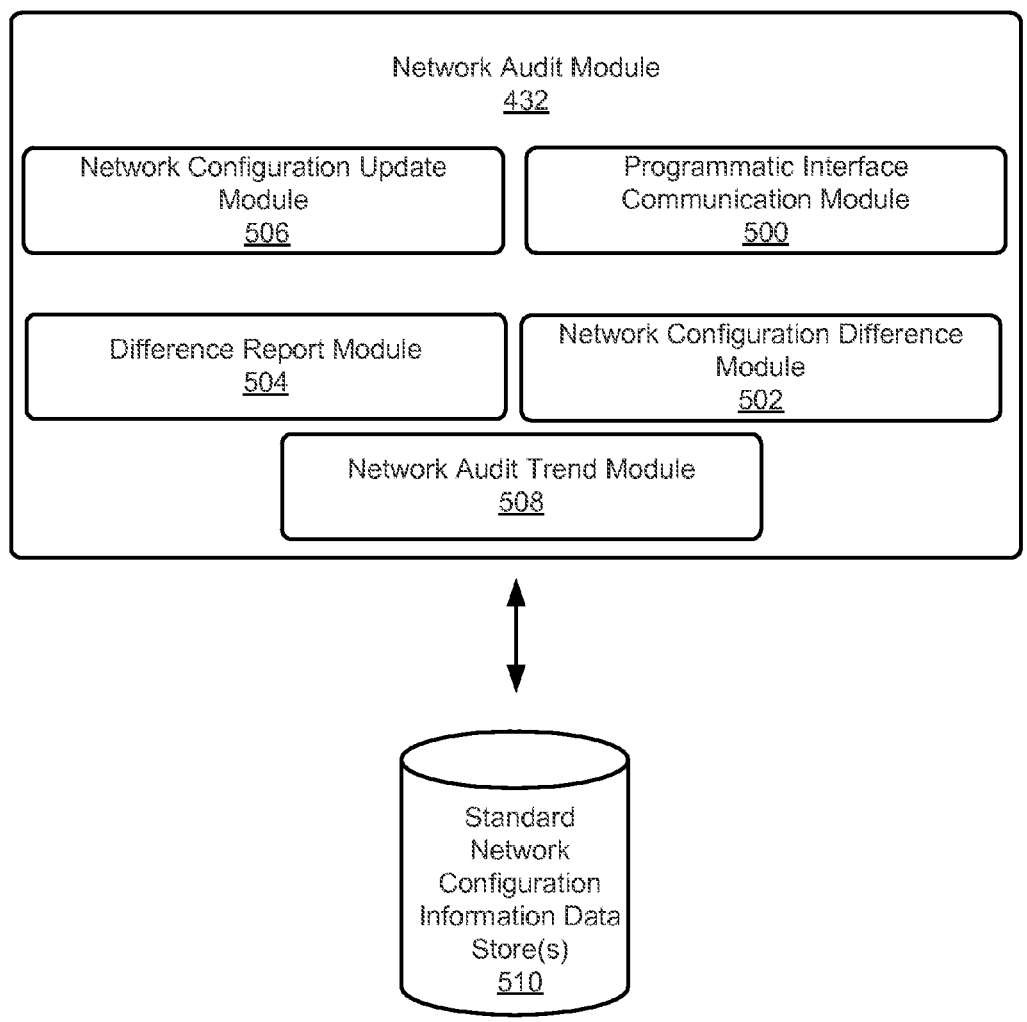
FIG. 5 is a schematic diagram that illustrates an example of a network auditing module and associated data stores in accordance with at least one embodiment.

FIG. 5 illustrates a schematic diagram depicting aspects of a network auditing module and associated data stores in accordance with at least one embodiment. It should be noted that while multiple modules are described in the example network audit module 432, the processes and methods described herein can be performed by more or less modules within memory such as memory 418 described above. In addition, while the modules 500-508 included in network audit module 432 are displayed and described as distinct modules, in some embodiments they may be included within one another to further facilitate methods and systems described herein. In accordance with at least one embodiment, the network audit module 432 may include a programmatic interface communication module 500, a network configuration difference module 502, a difference report 504, a network configuration update module 506, and a network audit trend module 508 in communication with one or more data stores 510 (which is an example of the one or more data stores 430 from FIG. 4).

In accordance with at least one embodiment, the network audit module 432 may maintain a standard network configuration. In accordance with at least one embodiment, may indicate a network configuration that is not currently implemented in a network of computer resources but is configured to optimize data transfer and does not have any security holes. In accordance with at least one embodiment, the network audit module 432 and programmatic interface communication module 500 may obtain the network configuration information for a network and store/maintain the current configuration as the standard network configuration. In accordance with at least one embodiment, the standard network configuration may represent a network of computer resources that is currently deployed and associated with the network auditing service. In accordance with at least one embodiment, the standard network configuration may be a configuration of resources that is known to be secure or that has been indicated as being secure by an administrator or other authorized user. In accordance with at least one embodiment, the network audit module 432 may maintain and store the standard network configuration in the one or more data stores 510.

In accordance with at least one embodiment, the network audit module 432 may update the standard network configuration based on input received from a network administrator or an administrator associated with the service. In accordance with at least one embodiment, the standard network configuration may be updated by a user of a network that is being audited by submitting a report of computer code indicating the desired changes the user would like to make to their network of computer resources. In accordance with at least one embodiment, the standard network configuration and the determination of differences may be a mix of identical matching criteria and fuzzy matching criteria based on the portion of the network in question or the particular computer resource being audited.

In accordance with at least one embodiment, the network audit module 432 and the one or more data stores 510 may maintain a plurality of policies that are associated with a standard network configuration. In accordance with at least one embodiment, each policy of the plurality of policies may correspond to a portion of the standard network configuration. For example, one policy may contain information about port ranges that are allowable in a standard network configuration while another policy may contain information about approved protocols for communicating between computer instances. In accordance with at least one embodiment, the network audit service may determine the differences between network configurations utilizing the plurality of policies to check each portion of a network of computer resources. In accordance with at least one embodiment, the network audit module 432 and programmatic interface communication module 500 may obtain the network configuration information from a network of computer resources that is being audited. In accordance with at least one embodiment, the programmatic interface communication module 500 interacts with a control plane associated with the network of computer resources to obtain metadata. The programmatic interface communication module 500 may call an API of the control plane to obtain the metadata. In accordance with at least one embodiment, the metadata includes the current network configuration. In accordance with at least one embodiment, the control plane maintains each user facing API call concerning the network of computer resources. The programmatic interface communication module 500 may determine the current configuration of the network based at least in part on the user facing API calls.

In accordance with at least one embodiment, the programmatic interface communication module 500 may interact with a programmatic interface of the control plane to obtain network configuration information. In accordance with at least one embodiment, the programmatic interface communication module 500 may invoke interface elements of the programmatic interface to obtain metadata that includes configuration information for a network of computer resources. In accordance with at least one embodiment, the programmatic interface communication module 500 may be configured to translate or transform the metadata or configuration information into a unified format. The unified format may be the same format as the standard network configuration information and allow for easier comparison and detection of differences between configurations. In accordance with at least one embodiment, the programmatic interface communication module 500 may be configured to generate a data structure of a unified format based on the obtained metadata including the network configuration information. The generated data structure may be provided to the network configuration difference module 502 to determine differences between configurations.

In accordance with at least one embodiment, the network configuration difference module 502 may be configured to determine differences between network configurations based on obtained metadata or configuration information. In accordance with at least one embodiment, the network configuration difference module 502 may determine the difference between the network configurations by identifying any difference between a standard network configuration and the current network configuration. In accordance with at least one embodiment, the network configuration difference module 502 may allow for fuzzy matching between the standard network configuration and the current network configuration in question. For example, each portion of the standard network configuration may have a range of values or states that are still considered to be approved and not indicate a security threat or difference when compared to a network configuration. In accordance with at least one embodiment, the network auditing service may utilize modules 432, 500, and 502 to audit portions of a network as opposed to the entire network configuration. For example, the service may obtain network configuration information and parse out the information that is of interest, such as port number information for comparison to the standard network configuration information to determine differences.

In accordance with at least one embodiment, the network audit module 432 and one or more data stores 510 may maintain/store a hierarchy of network configuration standards. The hierarchy of network configuration standards can be utilized when determining differences between a standard network configuration and a current network configuration. In accordance with at least one embodiment, the difference module 502 may determine differences between network configurations and classify the differences according to the hierarchy of configuration standards. In accordance with at least one embodiment, the difference module 502 may determine a difference between network configurations only when a difference is determined at a certain hierarchy level. For example, differences between allowable protocols for communication between hosts may not rise to a level of reporting but any commands for creating new subnets may be considered a difference and identified by the difference module 502.

In accordance with at least one embodiment, the difference report module 504 may track each difference determined by the network configuration difference module 502 for generating a report of differences. In accordance with at least one embodiment, the report of differences may indicate any difference determined by module 502 between the standard network configuration and a current network configuration. In accordance with at least one embodiment, the report module 504 may organize the differences determined by the network configuration difference module 502 for easier presentation. For example, the report may be organized according to particular portions of the network configuration or based on particular computer resources of the network in question. In accordance with at least one embodiment, the report may be organized based on the hierarchical standards described above.

In accordance with at least one embodiment, the report module 504 may provide instructions for emailing a network administrator the generated report of differences between network configurations. In accordance with at least one embodiment, the report module 504 may be configured to send a report to a particular network administrator based on the particular differences determined by the difference module 502. For example, a particular network administrator may be designated to handle maintenance and auditing of particular computer resources in a distributed computing environment and thus should only receive reports concerning relevant differences. The designation of who receives the report may be based on the differences determined and the hierarchy standard with which each difference is associated. In accordance with at least one embodiment, the generated report of differences may be provided for presentation to a user or network administrator via a user interface capable of being viewed through a network document browser.

In accordance with at least one embodiment, the network configuration update module 506 may modify the current network configuration based at least in part on the differences between the current network configuration and the standard network configuration as determined by the difference module 502. In accordance with at least one embodiment, the network configuration module 506 may interact with the control plane associated with the network configuration to provide instructions to modify the current network configuration based on the determined differences. As described above, if fuzzy matching rules are utilized by the difference module 502 then the update module 506 may skip or not include instructions to update particular portions of the current network configuration as the changes are not considered a threat according to the rules defining the fuzzy matching. In accordance with at least one embodiment, the network configuration update module 506 may be configured to receive input from a network administrator to revert changes made to a current network configuration to place it in compliance with the standard network configuration. In accordance with at least one embodiment, the network configuration update module 506 may invoke interface elements of a programmatic interface associated with a network of computer resources to modify the current configuration based on determined differences by module 502.

In accordance with at least one embodiment, the network audit trend module 508 may be configured to use the generated report of differences to determine difference trends or trend information of a network configuration. For example, the network audit trend module 508 may be identify that differences are detected within a certain networks port ranges but the rest of the network configuration is in compliance with the standard network configuration. The network audit trend module 508 may generate the trend information into a report for presentation to a network administrator. In accordance with at least one embodiment, the network configuration update module 506 and network audit trend module 508 may automatically determine modifications to a network configuration without the determined set of differences based on the trend information.

The automatic modifications may include more strict standards then what is currently being applied to the network configuration based on the identified trend information. For example, the current standard network configuration may allow for fuzzy matching regarding port ranges but the trend information may indicate that a security threat is imminent if more strict identical match standards are not applied to the network audit service with respect to this particular network of computer resources. In accordance with at least one embodiment, the trend information generated by the trend module 508 may be utilized to identify a particular network that is causing problems or may currently be a security threat. Particularized reports may be generated for users of the networks in question indicating that their networks may currently be compromised. In accordance with at least one embodiment, the network audit trend module 508 may identify from multiple reports of generated differences that while currently the network configuration does not pose a security threat, it is trending to create a problem that will need to be modified by the network configuration update module 506. For example, the standard network configuration may allow for only a certain bandwidth of communication from a web server to a log-server for a customer subnet. The trend module 508 may be able to utilize multiple network configuration reports to identify that the bandwidth is steadily increasing at an alarming rate and that the network administrator should be notified of the trend. In accordance with at least one embodiment, the network audit trend module 508 may be configured to track and store each network configuration that requires updates/modifications based on the update module 506. This information may be utilized to identify the user or customer of a network of computer resources and aid in the prevention of further security threats that originate from the particular user/customer.

Figure 6:
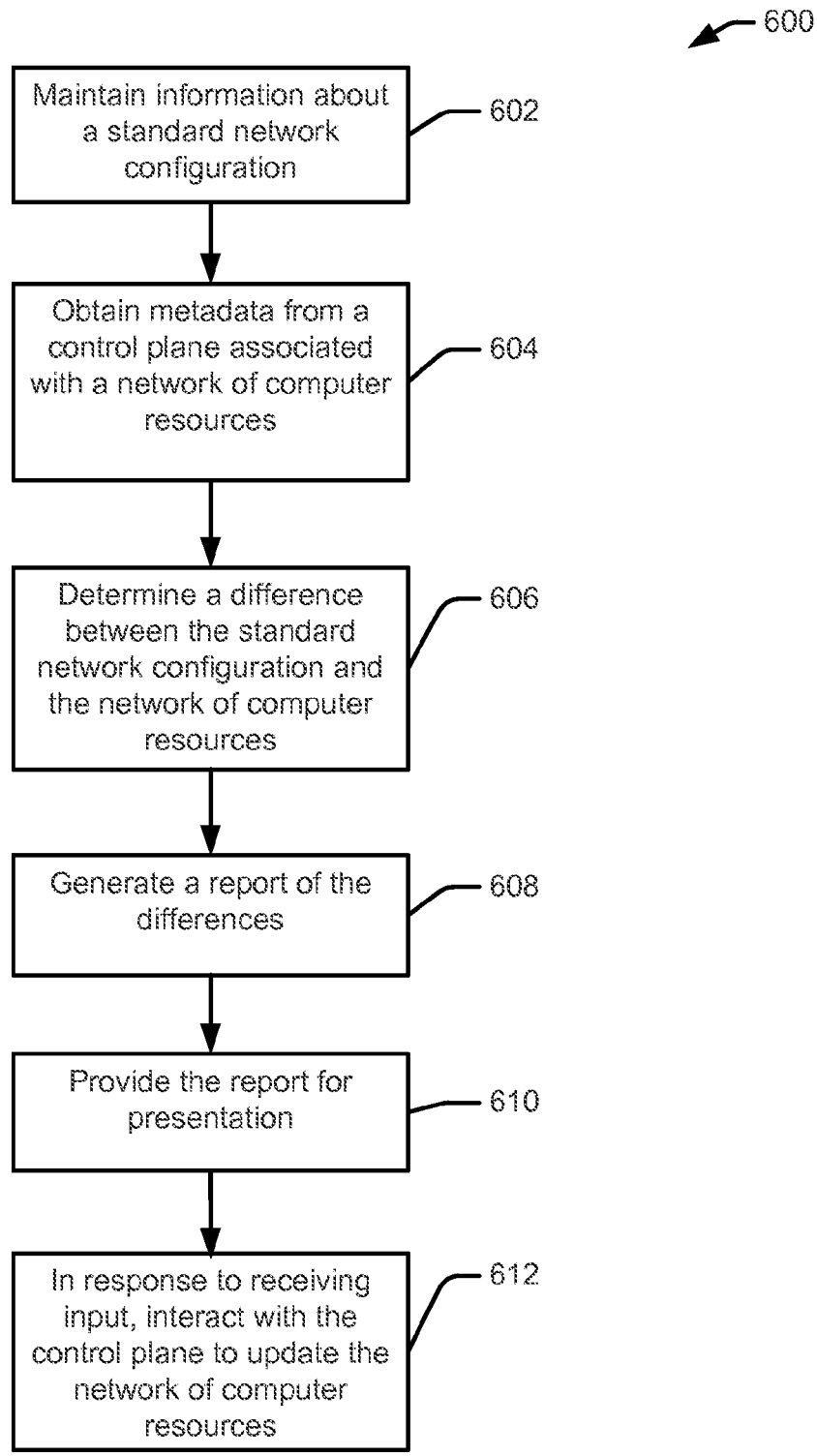
FIG. 6 illustrates a flow diagram of a process for a network auditing feature as described herein, in accordance with at least one embodiment.
Figure 7:
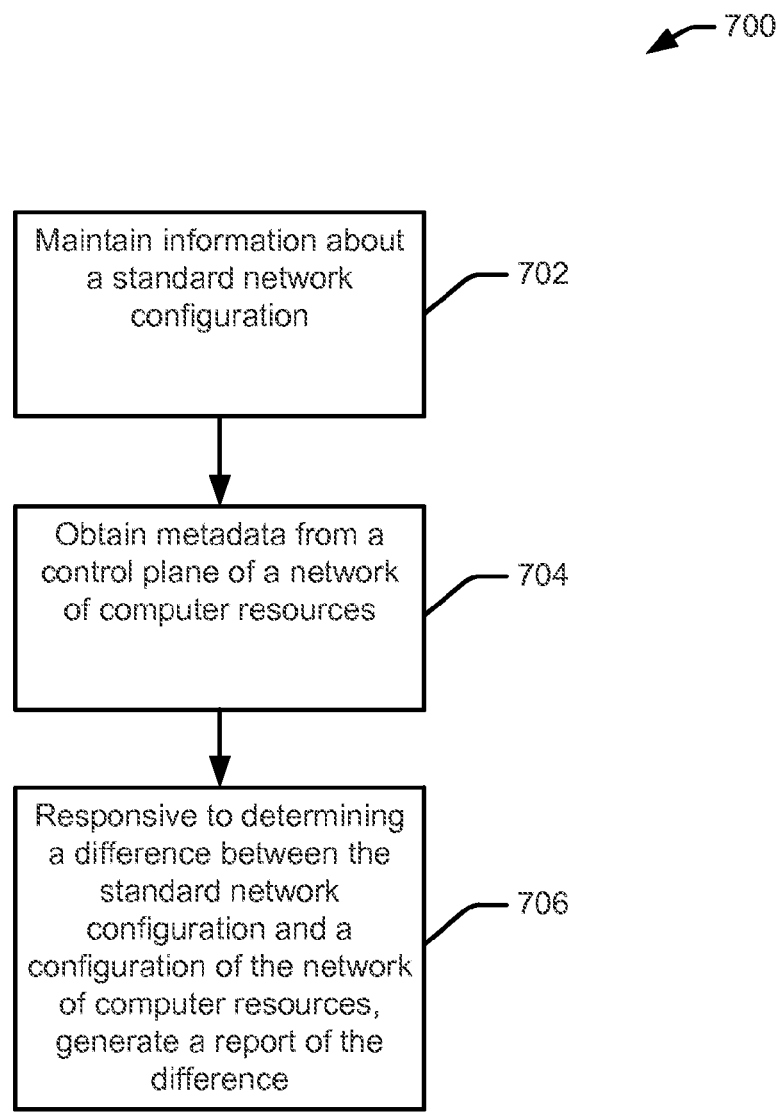
FIG. 7 illustrates a flow diagram of a process for a network auditing feature as described herein, in accordance with at least one embodiment.

FIGS. 6 and 7 illustrate example flow diagrams showing respective processes 600 and 700 for providing a network audit feature described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 410 (e.g., utilizing at least one of the network audit module 432, the programmatic interface communication module 500, the network configuration difference module 502, the difference report module 504, and the network configuration update module 506 in communication with one or more data stores 510) shown in FIGS. 4 and 5, may perform the process 600 of FIG. 6. In FIG. 6 the process 600 may include maintaining information about a standard network configuration. As described above, the standard network configuration may or may not represent a currently implemented configuration of deployed computer resources. The process 600 may include obtaining metadata from a control plane associated with a network of computer resources at 604. In accordance with at least one embodiment, the network audit service may obtain the metadata by interacting with a programmatic interface of the control plane. The metadata can include configuration data about the network of computer resources. The process 600 may include determining a difference between the standard network configuration and the network of computer resources at 606. In accordance with at least one embodiment, the difference may be determined based at least in part on a comparison of the information about the standard network configuration and the metadata. In accordance with at least one embodiment, a difference may be determined based on an identical match criteria or a fuzzy match criteria as described herein.

The process 600 may include generating a report of the determined differences between the standard network configuration and the network of computer resources. The process 600 may include providing the report for presentation 610. In accordance with at least one embodiment, the report of differences may be emailed to a network administrator associated with the network audit service or presented via a UI in a web browser or standalone application. The process 600 may conclude at 612 by interacting with the control plane to update the network of computer resources in response to receiving input. In accordance with at least one embodiment, the network auditing service may receive input from a network administrator to update or modify the network of computer resources to match the standard network configuration. The network administrator may utilize the generated report of differences to provide instructions to update the network of computer resources via the control plane. In accordance with at least one embodiment, the network audit service may automatically provide instructions to update/modify the network configuration based on the determined differences between the network configurations.

FIG. 7 illustrates a flow diagram of a process for a network audit feature as described herein, in accordance with at least one embodiment. In some examples, the one or more service provider computers 410 (e.g., utilizing at least one of the network audit module 432, the programmatic interface communication module 500, the network configuration difference module 502, and the difference report module 504 in communication with one or more data stores 510) shown in FIGS. 4 and 5, may perform the process 700 of FIG. 7. In FIG. 7 the process 700 may include maintaining information about a standard network configuration at 702. In accordance with at least one embodiment, the standard network configuration information may be updated by the network auditing service as described above. The process 700 may include obtaining metadata from a control plane of a network of computer resources. In accordance with at least one embodiment, the metadata may include configuration information about the network of computer resources. In accordance with at least one embodiment, the network auditing service may call an API of the control plane to obtain the metadata. In accordance with at least one embodiment, the network auditing service may invoke an interface element of a programmatic interface associated with the network of computer resources to obtain network configuration information. In accordance with at least one embodiment, the metadata or network configuration information may be translated or transformed into a uniform format or data structure for comparison to the standard network configuration information by the network audit service. The process 700 may conclude at 706 by generating a report of the differences between the network configurations responsive to determining a difference between the standard network configuration and a configuration of the network of computer resources. In accordance with at least one embodiment, determining a difference between the standard network configuration and the network of computer resources may include utilizing hierarchical rules or standards as described above.

Figure 8:
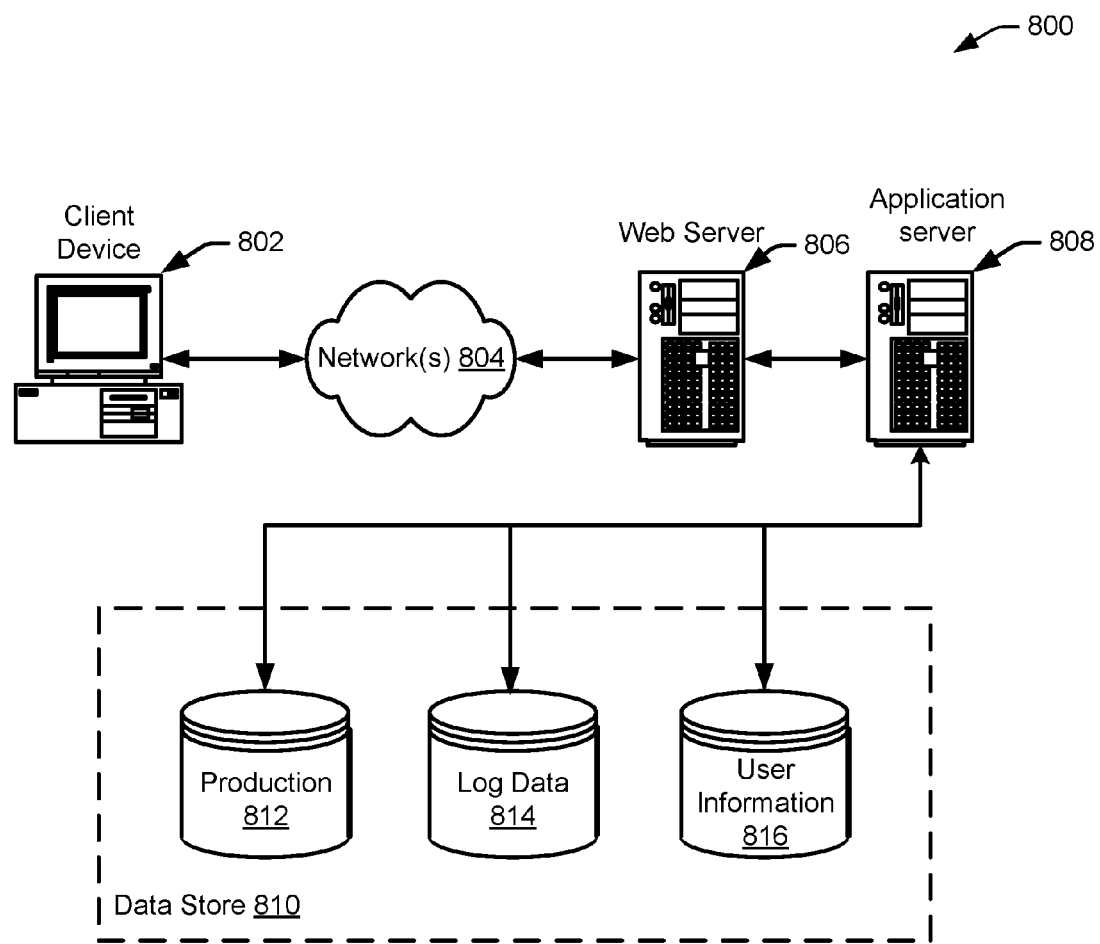
FIG. 8 illustrates an environment in which various embodiments of the network auditing feature can be implemented in accordance with at least one embodiment.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a computing system, information about a first network configuration associated with a first network of computer resources;
   obtaining metadata by interacting with a programmatic interface of a control plane associated with a second network of computer resources distinct from the first network of computer resources associated with the first network configuration, the metadata including configuration data about a second network configuration of the second network of computer resources that is configured to execute untrusted computer program code;
   maintaining a plurality of policies, the plurality of policies organized according to a hierarchical standard with respect to network configurations of computer resources, an individual policy of the plurality of policies applying to the second network of computer resources;
   determining, by the computing system, a difference between the first network configuration and the second network configuration based at least in part on a comparison of the maintained information, the plurality of policies, and the obtained metadata;
   generating a report of the difference between the first network configuration and the second network configuration;
   providing the report for presentation; and
   responsive to receiving input from an administrator of the second network of computer resources, interacting with the control plane via the programmatic interface to update the second network of computer resources based at least in part on the received input, the plurality of policies, and the maintained information.

2. The computer-implemented method of claim 1, wherein the programmatic interface includes a web service interface, a messaging protocol interface, an application programming interface (API), or a representational state transfer (REST) interface.

3. The computer-implemented method of claim 1, wherein obtaining the metadata comprises obtaining different resource information from individual network resources of the second network of computer resources.

4. The computer-implemented method of claim 1, wherein obtaining the metadata comprises translating the configuration data into a uniform data format.

5. The computer-implemented method of claim 1, wherein obtaining the metadata comprises transforming the configuration data into an information data structure.

6. A non-transitory computer-readable storage medium storing computer-executable instructions that, when executed by a computer system, configure the computer system to perform operations comprising:
  maintaining information about a first network configuration of a first network of computer resources;
  obtaining metadata from a control plane of a second network of computer resources distinct from the first network of computer resources, the obtained metadata including configuration information about a second network configuration of the second network of computer resources that is configured to manage third-party executable program code;
  maintaining a plurality of policies, the plurality of policies organized according to a hierarchical standard with respect to network configurations of computer resources, an individual policy of the plurality of policies applying to the second network of computer resources; and
  responsive to determining a difference between the first network configuration and the second network configuration based at least in part on the maintained information, the plurality of policies, and the obtained metadata, generating a report of the difference between the first network configuration and the second network configuration.

7. The non-transitory computer-readable storage medium of claim 6, the operations further comprising:
  providing the report for presentation; and
  in response to receiving input, providing instructions to the control plane to update the second network of computer resources based at least in part on the report and the information.

8. The non-transitory computer-readable storage medium of claim 6, wherein the first network configuration comprises a standard configuration, and wherein the standard configuration is updated by a network administrator associated with the standard configuration.

9. The non-transitory computer-readable storage medium of claim 6, wherein determining the difference between the first network configuration and the second network configuration includes utilizing an identical match criteria.

10. The non-transitory computer-readable storage medium of claim 6, wherein determining the difference between the first network configuration and the second network configuration includes utilizing a fuzzy matching criteria.

11. The non-transitory computer-readable storage medium of claim 6, the operations further comprising maintaining additional information about a plurality of standard network configurations, the plurality of standard network configurations organized according to the hierarchical standard, the hierarchical standard indicating a particular standard network configuration according to distinct computer resources of the second network of computer resources, and wherein determining the difference between the first network configuration and the second network configuration is further based at least in part on the additional information about the plurality of standard network configurations and the obtained metadata.

12. The non-transitory computer-readable storage medium of claim 6, the operations further comprising:
  collating a set of reports of the difference between the first network configuration and the second network configuration during a specified time period;
  determining trend information based at least in part on the set of the reports and the specified time period, the trend information identifying a particular computer resource of the network of computer resources as having a difference in comparison to the first network configuration; and
  providing the trend information for presentation to a network administrator associated with the first network of computer resources.

13. The non-transitory computer-readable storage medium of claim 12, the operations further comprising:
  providing the trend information to a user associated with the second network of computer resources; and
  applying a match criteria when determining the difference between the first network configuration and the second network configuration for the user.

14. A system, comprising:
  at least one processor; and
  memory including computer-executable instructions that, when executed by the at least one processor, cause the system to collectively at least:
    maintain a plurality of policies associated with a standard network configuration of a first sub-network of computer resources of a plurality of sub-networks within a distributed computing environment, a policy of the plurality of policies corresponding to a portion of the standard network configuration, the plurality of policies organized according to a hierarchical standard with respect to the distributed computing environment;
    obtain metadata from a programmatic interface associated with a second sub-network of computer resources, the second sub-network of computer resources being of the plurality of sub-networks within the distributed computing environment configured to execute third-party code, the second sub-network of computer resources being distinct from the first sub-network of computer resources associated with the standard network configuration, the metadata indicating a second configuration of the second sub-network of computer resources;
    determine a difference between the standard network configuration and the second configuration of the second sub-network of computer resources based at least in part on the obtained metadata and the plurality of policies;
    generate a report of the difference between the standard network configuration and the second configuration of the second sub-network of computer resources, the report indicating one or more additional differences between at least a portion of the standard network configuration and the second configuration of the second sub-network of computer resources.

15. The system of claim 14, wherein the computer-executable instructions further cause the system to at least update the second sub-network of computer resources based at least in part on the report and the plurality of policies.

16. The system of claim 15, wherein updating the second sub-network of computer resources includes executing a programmatic script of computer code to update the second sub-network of computer resources.

17. The system of claim 14, wherein the computer-executable instructions further cause the system to at least provide the report of the difference for presentation, wherein providing the report of the difference includes using at least an email, a network document user interface (UI), or an application UI.

18. The system of claim 14, wherein generating the report of the difference between the standard network configuration and the second configuration of the second sub-network of computer resources includes organizing the report based at least in part on particular computer resources of the second sub-network of computer resources.

19. The system of claim 14, wherein the computer-executable instructions further cause the system to at least:
obtain additional metadata from the programmatic interface associated with the second sub-network of computer resources at a later time in accordance with a specified time period, the additional metadata identifying a third network configuration;
determine a second difference between the second network configuration and the third network configuration based at least in part on the obtained metadata and the additional metadata;
generate an additional report of the second difference between the second network configuration and the third network configuration; and
provide the additional report of the second difference for presentation.

* * * * *